United States Patent [19]

Jarre et al.

[11]  4,237,240

[45]  Dec. 2, 1980

[54] PROCESS FOR THE MANUFACTURE OF FLEXIBLE POLYURETHANE FOAMS WITH HIGH LOAD-BEARING AND HIGH ENERGY-ABSORPTION CAPACITY

[75] Inventors: Wolfgang Jarre, Ludwigshafen; Peter Weyland, Frankenthal; Gerhard Mueller, Munich, all of Fed. Rep. of Germany

[73] Assignee: BASF Aktiengesellschaft, Fed. Rep. of Germany

[21] Appl. No.: 28,311

[22] Filed: Apr. 9, 1979

[51] Int. Cl.$^3$ .............................................. C08G 18/14
[52] U.S. Cl. ..................................... 521/159; 521/160
[58] Field of Search ................................ 521/159, 160

[56] References Cited

U.S. PATENT DOCUMENTS 3,936,483  2/1976  Gemeinhardt ........................ 521/160

FOREIGN PATENT DOCUMENTS 874430   8/1958  United Kingdom .
1417087 12/1975  United Kingdom .

*Primary Examiner*—Maurice J. Welsh
*Attorney, Agent, or Firm*—Norbert M. Lisicki; Joseph D. Michaels

[57] ABSTRACT

The invention concerns a process for the manufacture of flexible polyurethane foams by reaction of a mixture consisting of diphenylmethane diisocyanates and polyphenylene polymethylene polyisocyanates having a functionality greater than 2 containing 55 to 85 percent by weight diphenylmethane diisocyanate based on the total weight of the isocyanate mixture with polyester polyols or mixtures of polyester polyols and polyether polyols having a polyester polyol content of more than 60 percent by weight based on the weight of the polyol mixture, and optionally chain extenders, auxiliaries, and additives, in the presence of catalysts and, in particular, water as a blowing agent. The special selection of starting compounds results in the production of flexible polyurethane foams having a high resistance to hydrolysis, high load-bearing capacity, and high energy absorption upon impact.

7 Claims, No Drawings

PROCESS FOR THE MANUFACTURE OF FLEXIBLE POLYURETHANE FOAMS WITH HIGH LOAD-BEARING AND HIGH ENERGY-ABSORPTION CAPACITY

BACKGROUND OF THE INVENTION

1. Field of the Invention

The invention concerns a process for the manufacture of flexible polyurethane foams consisting of a mixture of diphenylmethane diisocyanates and polyphenylene polymethylene polyisocyanates (crude MDI) having a functionality greater than 2 containing 55 to 85 percent by weight diphenylmethane diisocyanate, polyester polyols or mixtures of polyester polyols and polyether polyols and auxiliaries and additives having a high resistance to hydrolysis, high load-bearing capacity, and high energy absorption upon impact.

2. Description of the Prior Art

The manufacture of flexible polyurethane foam is a known process. Toluene diisocyanate and particularly, the commercially available toluene diisocyanate isomer mixtures are commonly used as polyisocyanates. The disadvantage is that toluene diisocyanates, due to their high vapor pressure, are relatively strongly toxic and therefore, special precautionary measures must be taken and observed during processing.

In order to reduce the toxicity hazard and increase the reactivity, it has been suggested to replace the toluene diisocyanates with mixtures of toluene diisocyanates and a mixture of homologous polyarylene polyalkylene polyisocyanates for the manufacture of polyurethane plastics, including foams.

According to British Pat. No. 874,430, flexible polyurethane foams are also produced by reaction of polyether polyols with at least two hydroxyl groups and a polyisocyanate mixture consisting of diarylmethane diisocyanates and 5 to 10 percent by weight of a polyisocyanate having a functionality greater than 2 in the presence of water. According to German Published Application, No. 24 25 657, diphenylmethane diisocyanate mixtures having an average isocyanate functionality of less than 2.4 and not containing more than 60 percent by weight of 4,4'-diphenylmethane diisocyanate, with at least 15 percent by weight of the diphenylmethane diisocyanate isomer mixture consisting of 2,4'-diphenylmethane diisocyanate, are suited for the manufacture of integral skin foams.

All of these polyurethane foams, which are of great elasticity, have in common one drawback which prohibits their use in certain areas of application. This is their insufficient load-bearing capacity and their deficient energy absorption upon impact, particularly in the case of flexible foams of low densities. In order to lessen this drawback, it has been suggested to increase the density. This measure, however, only resulted in increasing the cost per piece. A satisfactory improvement of the above-mentioned mechanical properties could not be achieved with these measures.

BRIEF SUMMARY OF THE INVENTION

This invention concerns a process for the manufacture of flexible polyurethane foams by the reaction of a mixture consisting of diphenylmethane diisocyanates and polyphenylene polymethylene polyisocyanates having a functionality greater than 2 containing 55 to 85 percent by weight of diphenylmethane diisocyanate based on the total weight of the isocyanate mixture with polyester polyols or mixtures of polyester polyols and polyether polyols having a polyester polyol content of more than 60 percent by weight relative to the weight of the polyol mixture, and optionally chain extenders, auxiliaries, and additives, in the presence of catalysts and, in particular, water as a blowing agent. The special selection of starting compounds results in the production of flexible polyurethane foams having a high resistance to hydrolysis, high load-bearing capacity, and high energy absorption upon impact.

PREFERRED EMBODIMENTS

It was the purpose of this invention to produce, based on polyisocyanates with little or no toxicity, flexible polyurethane foams having a high load-bearing capacity and a large energy-absorption capacity upon impact.

This purpose was met by a process for the manufacture of flexible polyurethane foams of organic polyisocyanates, polyols, catalysts, blowing agents and possibly chain extenders, auxiliaries and additives, characterized in that a mixture of diphenylmethane diisocyanates and polyphenylene polymethylene polyisocyanates having a diphenylmethane diisocyanate content of 55 to 85 percent by weight, is used as organic polyisocyanates, that polyester polyols or mixtures of polyester polyols and polyether polyols having a polyester polyol content of 60 to approximately 100 percent by weight relative to the total weight of the polyol mixture are used as polyols, and that water or optionally mixtures of water and low-boiling, halogenated hydrocarbons, are used as blowing agents.

Surprisingly, it was found that the selection of the polyisocyanate mixture to be used according to this invention from the multitude of known and commercially available polyisocyanates in combination with polyester polyols or mixtures of polyester and polyether polyols consisting predominantly of polyester polyols as well as water or optionally, mixtures of water and low-boiling halogenated hydrocarbons, as blowing agents, results in flexible polyurethane foams having a high load-bearing and energy-absorption capacity. Also, especially remarkable is the high resistance to hydrolysis of the polyurethane foams manufactured according to this invention.

For the manufacture of flexible polyurethane foams according to the process of this invention, mixtures of diphenylmethane diisocyanates and polyphenylene polymethylene polyisocyanates having a diphenylmethane diisocyanate content of 55 to 85 percent by weight, preferably of 60 to 80 percent by weight, based on the total weight of the mixture, are used as organic polyisocyanates. It is basically unimportant in which quantity ratios the isomeric 4,4'-, 2,4'- and 2,2'-diphenylmethane diisocyanates are present in the mixture. According to the invention, it is of primary importance that the total content of diphenylmethane diisocyanate isomers in the mixture corresponds with the above-referenced concentrated conditions. Preferably, however, there are used such mixtures with a 2,4'-diphenylmethane diisocyanate content below 10 percent by weight, and particularly below 3 percent by weight, based on the total weight of diphenylmethane diisocyanate. Instead of the pure polyisocyanate mixtures, it is also possible to use ones which are modified with small quantities of an alkylene diol or polyoxyalkylene diol, such as propylene glycol, diethylene glycol and butylene glycol, in order to reduce the tendency toward crystallization, and which have an NCO content of 20 to 34 percent by weight, preferably of 25 to 30 percent by weight, based on the total weight of the urethane-modified mixture. The manufacture of such possibly urethane-modified polyisocyanate mixtures with the corresponding content of diphenylmethane diisocyanate isomers is described, for instance, in German Published Application Nos. 24 25 658, 25 13 793, and 25 13 796.

Polyester polyols with a molecular weight of 750 to 5000, preferably 1500 to 3000, and a functionality of 2 to 3.5, preferably 2 to 2.8, are preferably used as polyols. For some areas of application, it has proven to be advantageous to replace the pure polyester polyols with mixtures of polyester polyols and polyether polyols having a polyester content of 60 to approximately 100 percent by weight, preferably of 75 to 99.5 percent by weight.

Suitable polyester polyols may be produced, for instance, from dicarboxylic acids, preferably aliphatic dicarboxylic acids having 2 to 12, preferably 4 to 8, carbon atoms in the alkylene radical and polyvalent alcohols, preferably diols. These acids include, for instance, aliphatic dicarboxylic acids such as succinic acid, glutaric acid, pimelic acid, undecanedioic acid, dodecanedioic acid, and preferably adipic acid, cyclic dicarboxylic acids, such as 1,3- and 1,4-cyclohexane dicarboxylic acid, and aromatic dicarboxylic acids such as phthalic acid and terephthalic acid. Examples of di- and multifunctional, particularly difunctional, alcohols are: propylene glycol, trimethylene glycol, dipropylene glycol, 1,4-butanediol, 1,6-hexanediol, 1,10-decanediol, glycerine, trimethylolpropane, and preferably ethylene glycol and diethylene glycol. Alkanolamines such as triethanolamine and triisopropanolamine can also be used as multifunctional alcohols. If trifunctional compounds are used in the manufacture of the polyester polyols, their content must be chosen in such a manner that the functionality of the obtained polyester polyol is a maximum of 2.8, preferably 2 to 2.8.

Proven to have worked particularly well and therefore preferably used are those polyester polyols which are produced by polycondensation of a dicarboxylic acid mixture which, based on the total weight of the named dicarboxylic acids, contains: 20 to 35 percent by weight, preferably 28 to 33 percent by weight, succinic acid; 35 to 50 percent by weight, preferably 40 to 45 percent by weight, glutaric acid; and 20 to 32 percent by weight, preferably 24 to 28 percent by weight, adipic acid; and alcohol mixtures from ethylene glycol/diethylene glycol, ethylene glycol/trimethylolpropane, diethylene glycol/trimethylolpropane, ethylene glycol/triisopropanolamine, and diethylene glycol/triisopropanolamine. In addition to the named dicarboxylic acids, the dicarboxylic acid mixture may contain up to 5 percent by weight, preferably approximately 2 to 3 percent by weight, relative to the total weight, of impurities, which consist primarily of imides of the succinic and glutaric acids.

Dicarboxylic acid mixtures of the indicated type may, for instance, be obtained as by-products during the manufacture of adipic acid by oxidation of cyclohexanol or cyclohexanone with nitric acid. According to the invention, the polyester polyols may be used as such or in the form of mixtures.

As already stated, mixtures of polyester polyols and polyether polyols can also be used instead of the polyester polyols if the mixtures consist at least to 60 percent by weight of polyester polyols. Polyether polyols suitable for mixing have molecular weights of 400 to 7000, preferably 2000 to 5000, and functionalities of 2 to 3, preferably of 2 to 2.3, and particularly of approximately 2. The preferably primarily linear polyether polyols are produced according to known methods from one or more alkylene oxides with 2 to 4 carbon atoms in the alkylene radical and a starter molecule containing 2 to 3, preferably 2, bound active hydrogen atoms. Suitable alkylene oxides are, for instance, 1,2- or 2,3-butylene oxide, styrene oxide, and preferably ethylene oxide and 1,2-propylene oxide. Comparable products prepared from tetrahydrofuran and oxetane can also be employed. The above monomeric compounds may be used individually, alternatingly in sequence, or as mixtures. Possible starter molecules include: water, dicarboxylic acids such as succinic acid, adipic acid, phthalic acid, and terephthalic acid, N,N'-dialkyl-substituted diamines with 1 to 4 carbon atoms in the alkyl radical, such as dialkyl-substituted ethylenediamine, 1,2- or 1,3-propanediamine, 1,4-butanediamine, hexamethylenediamine, 4,4'-, 2,4'- and 2,2'-diaminodiphenyl methane, as well as N-alkyldiethanolamine, and preferably, multifunctional, particularly difunctional, alcohols such as ethylene glycol, propylene glycol, trimethylene glycol, diethylene glycol, dipropylene glycol, 1,4-butanediol, hexamethylene glycol, and trifunctional alcohols such as glycerine and trimethylolpropane.

It may, under certain circumstances, be appropriate to also use, in addition to the polyester polyols or mixtures of polyester and polyether polyols chain extenders for the manufacture of the flexible polyurethane foams. Possible chain extenders are, particularly, difunctional compounds having molecular weights of 18 to less than 300. Preferably used are aliphatic diols with 2 to 6 carbon atoms such as ethylene glycol, 1,4-butanediol, and hexamethylene glycol, and aromatic aliphatic diols such as bis-(2-hydroxyethyl) ether of hydroquinone.

Another feature of the process according to this invention is the use of water, which reacts with the isocyanate mixture and provides carbon dioxide, as blowing agent. Preferably used are 2 to 8 percent by weight, in particular 2.5 to 5 percent by weight, of water based on the weight of the polyol. Instead of water alone, optionally mixtures of water and chemically inert, low-boiling, halogenated hydrocarbons can also be used as foaming agents. These include, for instance, halogenated hydrocarbons having boiling points below 50° C., preferably between −50° C. and 30° C. at atmospheric pressure. The following detailed listing is used as an example: halogenated hydrocarbons such as monochlorodifluoromethane, dichloromonofluoromethane, dichlorofluoromethane, and trichlorofluoromethane and their mixtures, and hydrocarbons such as propane, n-butane, and isobutane as well as dimethyl ether. Suitable mixtures of water and halogenated hydrocarbons generally consist of 5 to 70 percent by weight, preferably 10 to 50 percent by weight, of water and 30 to 95 percent by weight, preferably 50 to 90 percent by weight, of halogenated hydrocarbons, with the percent by weight being based on the total weight of the blowing-agent mixture.

The required quantities of blowing agent mixture can be determined experimentally in a very simple manner as a function of the mixing ratio of water to halogenated blowing agents as well as the desired density of the foam and amount to approximately 2 to 40, preferably 5 to 25, percent by weight based on the weight of the polyol.

Catalysts which accelerate the formation of polyurethane, and possibly auxiliaries and additives which are normally used for the production of flexible polyurethane foams can be added to the foamable reaction mixture. These include, for example, surface-active materials, flame inhibitors, pore regulating materials, antioxidants, hydrolysis prevention agents, dyes, fillers, and other additives.

Suitable catalysts for accelerating the reaction among the polyols, the water, optionally the chain extenders, and the polyisocyanate mixture according to this invention are, for instance, tertiary amines such as dimethylbenzylamine, N,N,N',N'-tetramethyldiaminoethyl ether, bis-(di-methylaminopropyl) urea, N-methyl- or N-ethylmorpholine, N,N'-dimethylpiperazine, 1,2-dimethyl imidazole, 1-azabicyclo-(3,3,0)-octane, and preferably triethylenediamine; metal salts such as stannous octoate, lead octoate, and preferably tin-(II) salts and dibutyltin dilaurate, as well as especially mixtures of tertiary amines and organic tin salts. Preferably, 0.5 to 5 percent by weight of catalyst based on tertiary amines and/or 0.01 to 2.5 percent by weight of metal salts based on the polyol weight are used.

Further to be taken in consideration are, for instance, surface-active substances which serve to support the homogenization of the starting material and which are possibly also suited to regulate the cell structure of the flexible polyurethane foams.

These include, for example, siloxane-oxyalkylene mixed polymerizates and other organo-polysiloxanes, oxyethylated alkyl phenols, oxyethylated fatty alcohols, paraffin oils, castor oil or ricinoleic ester, and turkey red oil, which are used in quantities of 0.2 to 6 parts per weight per 100 parts by weight of polyisocyanate mixture.

In order to improve the flame resistance, the flexible polyurethane foams produced according to this invention can contain flame inhibitors. These include, for instance, compounds containing phosphorus and/or halogen atoms, such as tricresyl phosphate, tris-2-chloroethyl phosphate, tris-chloropropyl phosphate, and tris-2,3-dibromopropyl phosphate; inorganic flame inhibitors, such as antimony trioxide, arsenic oxide, ammonium phosphate, ammonium sulfate, among others, and preferably, derivatives of cyanic acid such as cyanamide, dicyandiamide, guanidine, and particularly guanidine salts, biguanidine, and, in particular, melamine. Derivatives of cyanic acid of this type are described, for instance, in German Patent Application No. P28 15 155.6 of BASF Aktiengesellschaft. In general, it has proven advantageous to use 5 to 70 parts by weight of such flame inhibitors for 100 parts by weight of the mixtures consisting of diphenylmethane diisocyanates and polyphenylene polymethylene polyisocyanates with 55 to 85 percent by weight of two-nucleus isomers.

Further details concerning the above-mentioned other commonly used auxiliaries and additives are contained in the literature, for instance, in the monograph by J. H. Saunders and K. C. Frisch, "High Polymers", Volume XVI, Polyurethanes, Part 1 and 2, Interscience Publishers, 1962 and 1964.

The flexible polyurethane foam can be manufactured according to the prepolymer process and preferably, according to the one-shot process.

If the flexible polyurethane foams are manufactured according to the one-shot process, usually a mixture of polyol, water, catalyst and possibly chain extenders, auxiliaries and additives is brought to reaction with the polyisocyanate mixture according to the invention at temperatures from 15° to 60° C., preferably, 25° to 40° C., in such quantities that the ratio of hydroxyl groups of the polyols and possibly chain extenders to NCO groups of the polyisocyanate mixtures is 0.1 to 0.4:1, preferably 0.15 to 0.3:1, and that the ratio of all Zerewitinoff active hydrogen atoms, bonded to polyol, possibly chain extenders and water, to the NCO groups of the polyisocyanate mixture is approximately 0.8 to 1.3:1, preferably 0.95 to 1.1:1. When a mixing chamber with several input jets is used, the liquid raw materials can be fed into the mixing chamber individually or, if the components are solid, in form of solutions or suspensions, and then mixed intensively in the mixing chamber. However, it has proven to be particularly appropriate to work according to the two-component process and to combine the mixture of polyol, water, catalyst, possibly chain extenders, auxiliaries and additives to form component A and to use the polyisocyanate mixture as component B.

For the manufacture of the prepolymer containing the NCO groups, the polyisocyanate mixture to be used according to the invention is brought to reaction with the already referenced polyols and/or chain extenders in such quantities that the ratio of NCO groups to the total hydroxyl is 10:1 to 95:1, preferably 70:1 to 90:1.

The prepolymers containing the terminal NCO groups are subsequently mixed with water or optionally mixtures of water and low-boiling, halogenated hydrocarbons and possibly additional polyols and/or chain extenders, and auxiliaries and additives, and are allowed to foam.

The flexible polyurethane foams produced according to this invention have densities of approximately 10 to 80 grams per liter. Due to their high load-bearing capacity and their large energy-absorption capacity upon impact, these materials are particularly well suited as energy absorbing materials for outfitting, particularly, the interiors of vehicles and as light impact-absorbing materials for the packaging sector, for foam backing of foils, textile coatings, etc.

The parts referred to in the examples are relative to weight.

EXAMPLES 1 TO 3 AND COMPARISON EXAMPLES A TO B

In order to manufacture a flexible polyurethane foam, a mixture of a polyester polyol, water, possibly trichlorofluoromethane, catalyst, and foam stabilizer is thoroughly mixed with a urethane-modified mixture of diphenylmethane diisocyanates and polyphenylene polymethylene polyisocyanates with a diphenylmethane diisocyanate content of 65 percent by weight at 25° C., and is allowed to foam in an open mold.

The raw materials used and the quantities as well as the mechanical properties of the obtained flexible foams are summarized in the following tables:

The following materials are used in Table I:

Polyester Polyol A: Polyester polyol based on adipic acid, diethylene glycol, trimethylolpropane OH Number 60; Visc. 75° C. 1000 cps; Functionality: 2.6

Polyester Polyol B: Polyester polyol based on succinic, glutaric, adipic acid, ethylene glycol, trimethylolpropane OH Number 59; Visc. 75° C. 1900 cps; Functionality: 2.6

Polyester Polyol C: Polyester polyol based on succinic, glutaric, adipic acid, ethylene glycol, diethylene glycol OH Number 56; Visc. 75° C. 600 cps; Functionality: 2.0
Polyether Polyol: Polyether polyol based on glycerineethylene oxide-propylene oxide OH Number 42; Functionality: 3

TABLE I

|  |  | Examples | | | Comparison Examples | |
|---|---|---|---|---|---|---|
|  |  | 1 | 2 | 3 | A | B |
| Polyester Polyol A | (Parts) | 500 | — | — | — | 500 |
| Polyester Polyol B | (Parts) | — | 500 | — | — | — |
| Polyester Polyol C | (Parts) | — | — | 500 | — | — |
| Polyether Polyol | (Parts) | — | — | — | 500 | — |
| Water | (Parts) | 20 | 20 | 20 | 19.5 | 20 |
| Trichlorofluoromethane | (Parts) | 50 | 50 | 50 | — | 50 |
| Dimethylbenzylamine | (Parts) | 7.5 | 7.5 | 7.5 | — | 7.5 |
| Triethylenediamine | (Parts) | 5.0 | 5.0 | 5.0 | 1.5 | 5.0 |
| Dimethylethanolamine | (Parts) | — | — | — | 1.5 | — |
| Tin dioctoate | (Parts) | — | — | — | 2.0 | — |
| Foam stabilizers based on polysiloxane-polyoxyalkylene Trade product of Goldschmitt AG, Essen: | | | | | | |
| Tegostab ®B 2888 | (Parts) | 15 | 15 | 15 | — | 15 |
| Tegostab ®BF 2370 | (Parts) | — | — | — | 3.5 | — |
| Urethane-modified mixture consisting of diphenylmethane diisocyanates and polyphenylene polymethylene polyisocyanates: NCO content: 29.6% Viscosity: 150 cps Diphenylmethane diisocyanate content 65% Content of three-nucleus isomers approximately 10% | | | | | | |
|  | (Parts) | 550 | 550 | 550 | — | — |
| Commercially available mixture from 2,4- and 2,6-toluene diisocyanates in a weight ratio of 80:20 | | | | | | |
|  | (Parts) | — | — | — | 240.5 | 327.5 |

TABLE II

Mechanical Properties of the Flexible Polyurethane Foams Produced

|  | Examples | | | Comparison Examples | |
|---|---|---|---|---|---|
|  | 1 | 2 | 3 | A | B |
| Density (g/l) | 24.8 | 23.9 | 25.0 | 25.0 | 21.0 |
| Tensile Strength (N/mm$^2$) | 0.135 | 0.128 | 0.136 | 0.1 | 0.13 |
| Strength at | | | | | |
| 20% Compression, (N/mm$^2$) | 0.58 | 0.41 | 0.44 | 0.31 | 0.32 |
| 40% Compression, (N/mm$^2$) | 1.25 | 1.06 | 1.0 | 0.35 | 0.52 |
| 60% Compression, (N/mm$^2$) | 2.68 | 2.3 | 2.25 | 0.60 | 0.92 |
| Sag Factor Factor (60%-20%) | 4.6 | 5.6 | 5.1 | 1.9 | 2.8 |

Table II shows the surprisingly high load-bearing capacity of the flexible foam produced by the process according to this invention (Examples 1 to 3).

In order to determine the hydrolysis resistance, an aged foam sample produced in accordance with Example 1 and another foam sample of the same age produced according to Comparison Example B were subjected to the following conditions:

A foam sample (20 grams) was stirred for one hour at 75° C. in 2 liters of a solution of 5 percent sodium hydroxide in alcohol/water (1:1).

While the foam produced in accordance with the invention did not show any decomposition as the result of the hydrolysis test, the foam produced according to Comparison Example B had completely dissolved after five minutes.

The energy absorption upon impact can be characterized by the resiliency, that is, the distance in percent of the falling distance by which a steel ball bounces back after hitting a foam sample (according to ASTM 1565).

The greater the energy absorption, the smaller the distance becomes over which the ball rebounds. Although values of 40 to 55 percent are measured with common flexible polyurethane foams and values of up to 80 percent are obtained with high-resiliency foams (literature: E. M. Maxey, Journal of Cellular Plastics, January/February, 1972, page 35 and following), values of 20 to 30 percent are obtained with flexible polyurethane foams produced according to the process of this invention.

The embodiments of the invention in which an exclusive property or privilege is claimed are as follows:

1. A process for the manufacture of flexible polyurethane foams from organic polyisocyanates, polyols, catalysts, foaming agents, and optionally chain extenders, auxiliaries and additives, wherein a mixture of diphenylmethane diisocyanates and polyphenylene polymethylene polyisocyanates having a diphenylmethane diisocyanate content of 55 to 85 percent by weight based on the weight of the isocyanate mixture is used as organic polyisocyanates; that polyester polyols or mixtures of polyester polyols and polyether polyols with a polyester polyol content of 60 to approximately 100 percent by weight based on the total weight of said polyol mixture are used as polyols; and that water or optionally, mixtures of water and low-boiling, halogenated hydrocarbons are used as blowing agents.

2. The process according to claim 1 wherein as said organic polyisocyanates there is used a urethane-modified mixture produced by reacting diphenylmethane diisocyanates and polyphenylene polymethylene polyisocyanates with a diphenylmethane diisocyanate content of 55 to 85 percent by weight based on the weight of the isocyanate mixture and multivalent hydroxyl compounds, with said urethane-modified mixture having an NCO content of 20 to 34 percent by weight based on the total weight of said urethane-modified mixture.

3. The process according to claim 1 wherein the mixture of diphenylmethane diisocyanates and polyphenylene polymethylene polyisocyanates contains less than 10 percent by weight of 2,4'-diphenylmethane diisocyanate based on the weight of the diphenylmethane diisocyanate.

4. The process according to claim 2 wherein the mixture of diphenylmethane diisocyanates and polyphenylene polymethylene polyisocyanates contains less than 10 percent by weight of 2,4'-diphenylmethane diisocyanate based on the weight of the diphenylmethane diisocyanate isomers.

5. The process according to claim 1 wherein polyester polyols having a molecular weight of 750 to 5000 and a functionality of 2 to 3.5 are used.

6. The process according to claim 5 wherein the polyester polyols are produced by polycondensation of a dicarboxylic acid mixture containing 20 to 35 percent by weight of succinic acid, 35 to 50 percent by weight glutaric acid, and 20 to 32 percent by weight of adipic acid with the percentages by weight based on the total weight of the dicarboxylic acid mixture, and di- or tri-functional alcohols.

7. The process according to claim 1 wherein the polyester polyols are produced by polycondensation of a dicarboxylic acid mixture containing 20 to 35 percent by weight of succinic acid, 35 to 50 percent by weight glutaric acid, and 20 to 32 percent by weight of adipic acid with the percentages by weight based on the total weight of the dicarboxylic acid mixture, and di- or tri-functional alcohols.

* * * * *